(12) United States Patent
Pettersson et al.

(10) Patent No.: US 8,095,680 B2
(45) Date of Patent: Jan. 10, 2012

(54) REAL-TIME NETWORK TRANSPORT PROTOCOL INTERFACE METHOD AND APPARATUS

(75) Inventors: Mattias Pettersson, Lund (SE); Frederic Gabin, Bagnolet (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 752 days.

(21) Appl. No.: 12/171,179

(22) Filed: Jul. 10, 2008

(65) Prior Publication Data
US 2009/0164655 A1 Jun. 25, 2009

Related U.S. Application Data

(60) Provisional application No. 61/015,283, filed on Dec. 20, 2007.

(51) Int. Cl.
*G06F 15/16* (2006.01)
(52) U.S. Cl. .......................... 709/231; 709/220; 709/232
(58) Field of Classification Search .................. 709/220, 709/231, 232
See application file for complete search history.

(56) References Cited

U.S. PATENT DOCUMENTS

| 2004/0030743 | A1 | 2/2004 | Hugly et al. | |
|---|---|---|---|---|
| 2008/0010392 | A1* | 1/2008 | Melpignano | 710/117 |
| 2008/0134012 | A1* | 6/2008 | Kokes et al. | 715/201 |

FOREIGN PATENT DOCUMENTS
EP 1619853 A2 1/2006

OTHER PUBLICATIONS

The Khronos Group Inc. "OpenMAX Application Layer Application Programming Interface Specification". Version 1.0 Provisional RC2, Sep. 2, 2007, Available at: http://www.khronos.org/files/openmax_al_1_0_provisional_specs.pdf.
The Khronos Gropu Inc, "The OpenMAX Integration Layer Application Layer Programming Interface Specification" Dec. 16, 2005, Available at: http://www.khronos.org/files/openmax_il_spec_1_0.pdf.
3rd Generation Partnership Project. 3GPP TS 22.246, V8.5.0 (Mar. 2008). 3rd Generation Partnership Project; Technical Specification Group Services and System Aspects; Multimedia Broadcast/Multicast Service (MBMS) user services; Stage 1 (Release 8). Mar. 2008.

(Continued)

*Primary Examiner* — John Follansbee
*Assistant Examiner* — Nghi Tran
(74) *Attorney, Agent, or Firm* — Coats & Bennett, P.L.L.C.

(57) ABSTRACT

An electronic device has a multimedia framework including an integration layer and a higher-level application layer. The integration layer includes predefined media processing components having an input/output interface configurable based on the type and format of media content delivered to the device during a streaming media session and that provide predefined media processing functions to the application layer for enabling playback of the media content. A streaming media management component included in the integration layer establishes and manages the streaming media session and configures one or more content pipes used during the streaming media session to access packets received by one or more sockets. The component also maps the content pipes to the sockets and processes packets retrieved from the one or more content pipes such that the media content is provided to corresponding ones of the predefined media processing components in accordance with their configured input/output interfaces.

21 Claims, 5 Drawing Sheets

OTHER PUBLICATIONS

3rd Generation Partnership Project. 3GPP TS 23.246, V8.1.0 (Dec. 2007). 3rd Generation Partnership Project; Technical Specification Group Services and System Aspects; Multimedia Broadcast/Multicast Service (MBMS); Architecture and functional description (Release 8). Dec. 2007.

3rd Generation Partnership Project. 3GPP TS 26.114, V7.4.0 (Mar. 2008). 3rd Generation Partnership Project; Technical Specification Group Services and System Aspects; IP Multimedia Subsystem (IMS); Multimedia Telephony; Media handling and interaction (Release 7). Mar. 2008.

3rd Generation Partnership Project. 3GPP TS26.234, V7.5.0 (Mar. 2008). 3rd Generation Partnership Project; Technical Specification Group Services and System Aspects; Transparent end-to-end Packet-switched Streaming Service (PSS); Protocols and codecs (Release 7). Mar. 2008.

Schulzrinne, H. et al. "Real Time Streaming Protocol (RTSP)." IETF, Network Working Group, Request for Comments: 2326. Apr. 1998.

The Khronos Group Inc. "OpenMAX Integration Layer Application Programming Interface Specification." Version 1.1.1, Sep. 14, 2007. Available at: http://www.khronos.org/files/openmax_il_spec_1_1_1.pdf.

The Khronos Group Inc. "OpenMAX Streaming Media Portability." Mar. 2007. Slideshow available at: http://www.khronos.org/developers/library/gdc_2007/Handheld-Technologies/Handheld-Technologies_OpenMAX.pdf.

Author Unknown. "RTSP Interoperability with RealSystem Server 8." RealSystem iQ Whitepaper, Dec. 7, 2000. Available at: http://docs.real.com/docs/rtsp.pdf.

\* cited by examiner

REAL-TIME NETWORK TRANSPORT PROTOCOL INTERFACE METHOD AND APPARATUS

PRIORITY CLAIM

This application claims priority to U.S. Provisional Patent Application No. 61/015,283 filed on Dec. 20, 2007.

TECHNICAL FIELD

The present invention generally relates to media content, and more particularly relates to processing media content delivered to an electronic device in accordance with a real-time network transport protocol.

BACKGROUND

The OpenMAX Integration Layer (IL) API (application programming interface) is an open standard developed by the Khronos Group for providing a low-level interface for audio, video, imaging and timed-text media components used in embedded and/or mobile devices. The principal goal of the OpenMAX IL is to give media components a degree of system abstraction for the purpose of portability across an array of different hardware and software platforms. The interface abstracts the hardware and software architecture in the system. Each media component and relevant transform is encapsulated in a component interface. The OpenMAX IL API allows the user to load, control, connect, and unload the individual components, enabling easy implementation of almost any media use scenario and meshing with existing graph-based media frameworks.

The OpenMAX IL API defines media components such as audio/video/image decoders/encoders, audio/video/image readers/writers, audio renderers, video schedulers, container demuxers/muxers, clocks, audio/video/image processors and the like. The OpenMAX IL API allows a client such as an application or media framework to create a media processing chain by connecting together various components. Content data is typically fed into the chain at one end and sequentially processed by each component in the chain. The data is transported between components using ports and buffers.

The OpenMAX IL API also defines an interface for accessing data from a local file or from a remote location. This concept is referred to as a content pipe and is described in chapter 9 of the OpenMAX IL API specification. A 'content pipe' is an abstraction for any mechanism of accessing content data (i.e. pulling content data in or pushing content data out). This abstraction is not tied to any particular implementation. Instead, a content pipe may be implemented, for example, as a local file, a remote file, a broadcast, multicast, or unicast stream, memory buffers, intermediate data derived from persistent data, etc. Moreover, a content pipe need not be limited to a single method of providing access. For example, a single pipe may provide content via both local files and remote files, or through multiple transport protocols. A system may include one or many content pipes.

There are various methods for operating a content pipe such as creating a content pipe based on a URI (uniform resource identifier), reading/writing a number of bytes from/to the content pipe and setting/getting byte position inside the content. In addition, asynchronous methods can be used for remote access such as by checking available bytes, getting a large buffer from the content pipe that the content pipe user can read from and providing a large buffer to write to the content. In each case, the OpenMAX IL API essentially models content pipe access like traditional file access.

One mechanism for remotely controlling the delivery of media content is the real-time streaming protocol (RTSP) defined by the IETF (Internet Engineering Task Force) in RFC 2326. RTSP is a client-server text-based protocol that enables a client to remotely control a streaming server. The client transmits RTSP method requests and the server replies with RTSP method responses. Typical RTSP commands include DESCRIBE, SETUP and PLAY. The packet-switched streaming service (PSS) is defined by 3GPP and is based on RTSP, but defines a complete service for streaming. To establish a streaming session, the streaming client needs a session description. A streaming session is defined via the session description protocol (SDP), which may be obtained in practice from either an .sdp file downloaded from, e.g., a WAP (wireless access protocol) page, or an SDP retrieved in a response from a streaming server to the use by a client of the DESCRIBE command towards an RTSP URI (e.g. rtsp://server.com/clip). The SDP information includes configuration parameters for the streaming session and for the corresponding media streams and decoding thereof.

A media stream (e.g., audio, video, images and/or timed-text) is established when a client requests the server to set up an RTP (real-time protocol) connection with the client, the media format being described in the SDP. Thus, RTSP is used to establish the streaming session and to control the server while RTP is used to carry the actual media content once the streaming session is established. A typical streaming client has one TCP (transmission control protocol) connection for RTSP signaling. In addition, for each media type that the session includes, the streaming client will have two UDP (user datagram protocol) connections. The first UDP connection is used for reception of RTP traffic, and the second UDP connection is used for exchange of RTCP (real-time control protocol) packets (both RTP and RTCP are carried over UDP). RTCP packets are sent by both the server and the client, enabling both devices to give feedback about the RTP transmission progress.

RTP packets include payload data, typically encoded media frame data provided in a format favorable for streaming. Typically, the payload data may need some processing (e.g., "de-packetization") before the coded frame can be sent to the media decoder. De-packetization involves extracting the encoded media frame data by removing the packet header information and other packet encapsulation information. RTP packets also include a time stamp which indicates when the content of the frame was sampled relative to other frames in the same stream. The timestamp information, together with inter-media synchronization information transmitted by the server (which is received in either an RTSP message or an RTCP message), can be used to establish the local time of the client at which each frame should be rendered and presented. This way, the client can maintain synchronization between different media streams. The streaming client also typically deploys jitter buffers that hold some RTP data before decoding and rendering. Buffering the RTP data enables the client to account for variations in transmission delays that arise from the server to the client. Buffering is also used to reorder packets that arrive out of sequence during a streaming media session.

Real Media streaming is a type of media streaming that differs from 3GPP streaming. Real Media streaming uses only one UDP connection to carry multiple streams, unlike 3GPP streaming which uses multiple UDP connections. Also, media packets are distinguished by a stream identifier. Real Media streaming uses a proprietary transport format called Real Data Transport (RDT). With Real Media streaming, it is possible to use a proprietary mechanism for feeding back information to the streaming server, but the feedback mechanism does not require a separate UDP connection. Thus, Real Media streaming only requires one UDP port in total.

Windows Media streaming is yet another way of transporting streaming media content. Windows Media streaming uses RTP to transport an Advanced Systems Format (ASF) file to the client. The ASF file is a container format which holds frames for all media types and streams. Windows Media streaming thus also uses only one UDP connection to carry all media content. As such, both Real Media and Windows Media streaming need some form of de-multiplexing before the media content can be de-packetized and decoded.

MBMS (multimedia broadcast and multicast service) is a mechanism for remotely delivering media content to a client in a cellular environment. MBMS defines a bearer service and a user service. The bearer service allows efficient use of broadcast or multicast bearers in the cellular environment. Traditionally, bearers over cellular networks are bidirectional point-to-point bearers. MBMS allows for the setup of unidirectional downlink bearers to multiple receivers. The MBMS User Service allows streaming and downloading of multimedia content over unicast, multicast, or broadcast bearers. Mobile TV services can be realized over MBMS User Service using the streaming protocols defined in the 3GPP TS 26.346 specification. MBMS streaming uses RTP for transporting multimedia data and mobile TV sessions are described using SDP. MBMS protocols and codecs are aligned with PSS. However, RTSP is not used when only unidirectional bearers are employed.

DVB-H (Digital Video Broadcasting-Handheld) is another way to remotely deliver media content to a client in a wireless environment. As its name indicates, DVB-H is the handheld version of a broadcast standard which includes the well-known satellite (DVB-S), terrestrial (DVB-T) and cable (DVB-C) versions. DVB-H was specified by the DVB project and subsequently endorsed by regional standardization bodies (e.g., ETSI EN 302 304). DVB-H is an adaptation of DVB-T that takes into account the specific requirement of handheld devices with respect to power consumption, processing capabilities and multimedia rendering capabilities. Mobile TV services over DVB-H use the DVB-IPDC service layer where IPDC stands for IP datacasting. The DVB-IPDC service layer describes the Electronic Service Guide (ESG), the content delivery protocols (CDP), and service purchase and protection (SPP). An alternative service layer to DVB-IPDC is OMA BCAST. The transport protocol for DVB-IPDC is RTP and mobile TV sessions are described using SDP. RTSP is not used with DVB-H because of its unidirectional nature.

Still another media content distribution technology is MTSI (Multimedia Telephony Service over IMS), where IMS stands for IP Multimedia Subsystem. MTSI is specified by 3GPP. MTSI is an evolution of traditional telephony and Voice over IP (VoIP), whereby traditional speech telephony calls are enriched with multimedia content such as video and text and during which users can share multimedia files (e.g. images and video clips). MTSI protocols are based on IMS protocols for session description and control (Session Initiation Protocol (SIP) and SDP). MTSI uses RTP to transport multimedia content between parties.

OpenMAX only defines playback of media content from a local or remote location (i.e., a file), but it does not address media carried over RTP. The OpenMAX IL API does not playback and record from/to transport over RTP. Thus, OpenMAX is generally incapable of directly supporting streaming, including streaming implemented using RTSP and RTP. Further, as shown below, attempts to implement streaming using OpenMAX IL content pipes are unlikely to work correctly.

There are at least two general ways to support PSS with OpenMAX IL. One way is to bridge OpenMAX IL to the network stack with the IL client and/or application. Another way is to use "content pipes" as suggested in the OpenMAX IL specification. OpenMAX IL can handle PSS using the client application as a bridge. The application has control of the server via an RTSP control interface. The client also has control of the media decoders via the IL client (e.g. OpenMAX AL or any other multimedia framework) and the OpenMAX IL API. RTP/RTSP (e.g., control, RTP buffers, RTCP, etc.) function outside the OMX IL implementation. Media decoders, synchronization and rendering are performed within the OpenMAX IL implementation.

Once a PSS session is established, the IL client can setup the decoder and renderer components. Data in the form of audio/video stream buffers are transferred from the RTP stack to the multimedia decoders via the application or the IL client. Timestamps must be added to the audio and video flows for proper synchronization in OpenMAX IL. However, functions such as seeking, play and pause are not possible from within the OMX IL interface with such an approach. In addition, the IL client must introduce time stamps in payloads from the RTP stack to feed into the OMX IL filter graph. Moreover, RTP and RTSP are not integrated into OpenMAX, even though they are a part of the player chain.

Streaming may also be handled in Open MAX IL using content pipes. The IL client can create its own custom content pipes. In this case, each custom content pipe can be used to transfer audio and video streams from RTP to OMX IL decoders as described above. However, it is unclear what type of component can leverage the content pipe because decoders cannot be directly connected to a content pipe according to OpenMAX. The IL client can also provide a streaming URI to a reader/demuxer component. The reader/demuxer would then create its own content pipe using the URI provided. The implementation of the content pipe in theory can then provide all streaming functionalities. However, with only one content pipe opened for the streaming session, all audio and video streams would go through that pipe. OpenMAX does not define how such multiplexed media data would be subsequently formatted and de-multiplexed. Also, no control is given via the content pipe to control the streaming session. Moreover, synchronization information coming from RTP must be translated into timestamps, but this is not currently supported in OpenMAX. OpenMAX also does not define how to retrieve the information about content format (i.e. the SDP) via the content pipe to setup the correct decoders. Thus, there is no benefit for using a content pipe for processing PSS media data in view of the current OpenMAX standard.

OpenMAX primarily focuses on the media plane. For RTSP streaming and other datacom protocols, a control plane towards the server is also needed. This not addressed by OpenMAX. Further, the content pipe concept is modeled after file access (i.e., read (a number of) bytes, and all media data is indexed by bytes). A streaming server cannot be controlled according to how many bytes the client reads from the incoming RTP packets. The streaming server must be controlled via RTSP. In addition, RTSP typically uses time, measured in seconds (normal play time—NPT), as the index, not bytes.

Moreover, it is also unclear how seeking should be performed in OpenMAX with an RTP source. If the (potential) demuxer is set to a new position, OpenMAX does not define how the streaming server should be informed when the RTSP implementation is in a content pipe. As noted above, content pipes only index bytes, not NPT as in RTSP. Further, synchronization in OpenMAX is not defined for RTP-based protocols. With streaming, the synchronization information may come from RTCP or from RTSP. This information must be at hand for the component handling the time-stamping.

Yet another issue is how multiple streams (as in 3GPP streaming) and multiplexed streams (as in Real and WMT streaming) are handled by the same client. For example, it is not clear how many content pipes should be used in such a scenario. If only one content pipe is used, 3GPP streams would have to be multiplexed before the content pipe. If more than one content pipe is used, Real and WMT streams would have to be de-multiplexed before the content pipes.

Also, there is no payload handling required for playback from a file, as the reader or demuxer is already able to locate and extract the coded media frames in the file. The decoder could possibly be responsible for RTP payload handling in the streaming case, but it would be seen as something outside the typical responsibility of a decoder (and might contradict the input format for OpenMAX IL decoders). The demuxer/reader could also possibly be responsible for RTP payload handling in the streaming case, but it would be less flexible. It would be desired to be able to route RTP packets between OpenMAX IL components, e.g., for recording.

Finally, MTSI (which provides speech-related services) requires very short delays in the buffers and must be able to handle variations of the amount of data in the jitter buffers. Again, an RTP element is required to perform rate adaptation, time-stamping, and de-packetization. A jitter buffer is inserted and the time-scaler unit placed after the speech decoder requires a fast two-way control interface with the jitter buffer to allow for minimization of speech path delay.

SUMMARY

According to the methods and apparatus taught herein, an electronic device has a multimedia framework including an integration layer and a higher-level application layer. The integration layer includes predefined media processing components having an input/output interface configurable based on the type and format of media content delivered to the device during a streaming media session. The streaming media processing components provide predefined media processing functions to the application layer for enabling playback of streaming media content and non-streaming media sessions such as local file playback. A streaming media management component included in the integration layer establishes and manages the streaming media session and configures one or more content pipes used during the streaming media session to access packets received by one or more sockets. The packets are encapsulated according to a real-time network transport protocol. The component also maps the content pipes to the sockets and processes packets retrieved from the one or more content pipes such that the media content is provided to corresponding ones of the predefined media processing components in accordance with their configured input/output interfaces.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
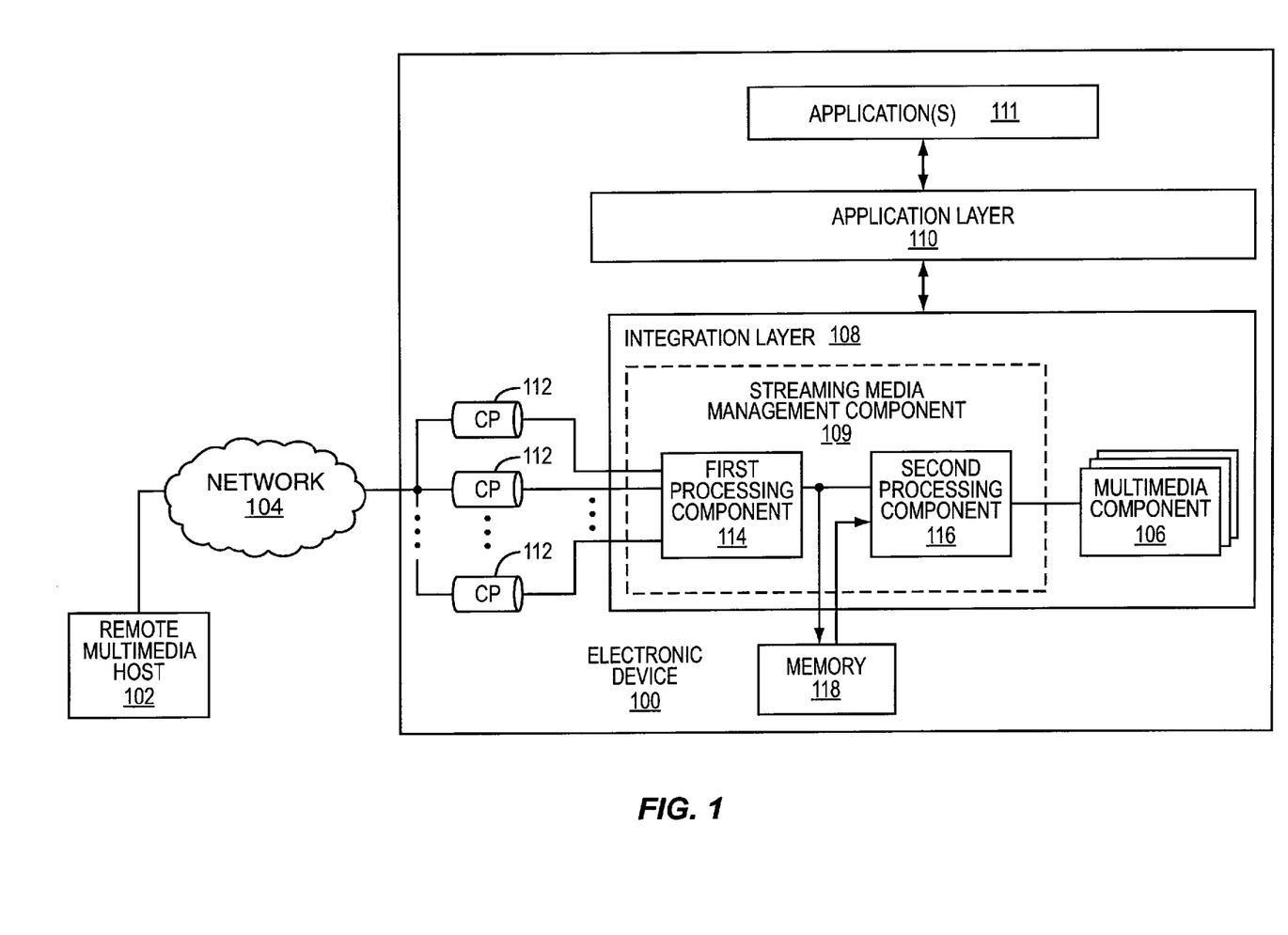
FIG. 1 is a block diagram of an embodiment of an electronic device that processes media content delivered as packet data transmitted in accordance with a real-time network transport protocol.

FIG. 1 illustrates an embodiment of an electronic device 100 such as a computer, mobile phone, handheld device or the like in contact with a remote multimedia host 102 via a network 104. The electronic device 100 includes a plurality of predefined media processing components 106 for processing media content received from the remote host 102 such as audio, video, images, timed text, etc. Each media component 106 can be embodied in software, hardware, firmware or any combination thereof and performs one or more media-related functions such as decoding, encoding, synchronization, rendering, scheduling, signal processing, error handling, etc.

The media components 106 reside within an integration layer 108 of the electronic device 100. The integration layer 108, together with a higher-level application layer 110, form a multimedia framework. The application layer 110 provides an interface between one or more multimedia applications 111, such as a media player, and the integration layer 108. The integration layer 108 provides an interface between the application layer 110 and the multimedia components 106. The integration layer 108 includes a streaming media management component 109 for providing application layer 110 access to the streaming media control and transport functions and feeding media data to components 106. In one embodiment, the media components 106 and streaming media management component 109 comply with the OpenMAX IL standard. The application layer 110 can be embodied as an application that is part of the higher-level multimedia framework and has access to the lower-level multimedia components 106 and streaming media management components 109. In one embodiment, the application layer 110 is the OpenMAX AL From time-to-time, the application layer 110 requests delivery of media content from the remote host 102 via a streaming media session. The streaming media management component 109 establishes and manages the streaming media session with the remote host 102. In response to the request, the remote host 102 delivers packet data transmitted in accordance with a real-time network transport protocol such as RTP, RDT, etc. The electronic device 100 includes one or more content pipes 112 for accessing the media content upon receipt. Each content pipe 112 can be a local file, remote file, broadcast stream, one or more memory buffers, intermediate data derived from persistent data or the like. In each case, the media content accessed by the content pipes 112 is formatted in accordance with a real-time network transport protocol.

The streaming media management component 109 configures one or more of the content pipes 112 for accessing packets during the streaming media session. In one embodiment, the streaming media management component 109 configures one or more of the content pipes 112 as a network socket. The predefined media processing components 106 have an input/output interface configurable based on the type and format of the media content delivered to the device 100. The multimedia components 106 provide predefined media processing functions to the higher-level application layer 110 for enabling playback of the media content. The streaming media management component 109 processes the packets retrieved from the one or more content pipes 112 such that the media content is provided to corresponding ones of the predefined media processing components 106 in accordance with their configured input/output interfaces, ensuring proper playback of the media content.

In one embodiment, the streaming media management component 109 converts the packet data by buffering and de-interleaving the packet data based on header information extracted from the received packets. The streaming media management component 109 extracts payload data from the de-interleaved packet data and converts the extracted data to coded media frame data capable of being decoded by one or more of the media components 106. The streaming media management component 109 also maintains synchronization between different ones of the media components 106 based on timing information delivered to the electronic device 100 from the remote host 102. Broadly, the streaming media management component 109 forms a common boundary between the content pipes 112 and media components 106 for seamlessly handling streaming media content delivered to the electronic device in a real-time network transport protocol format. This way, neither the content pipes 112 nor the media components 106 have to be capable of processing real-time network transport protocol packet data.

Figure 2:
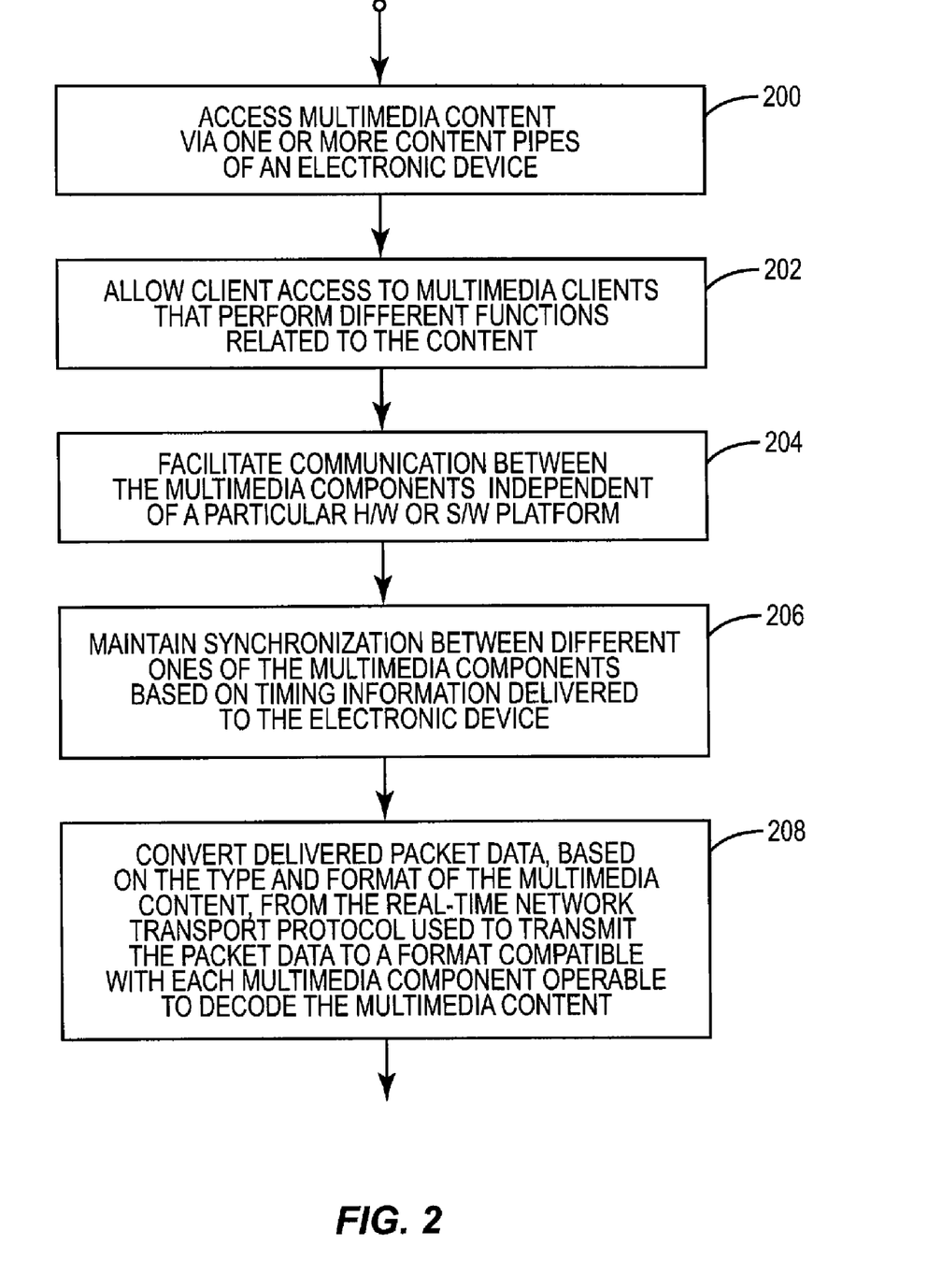
FIG. 2 is a flow diagram of an embodiment of program logic for processing media content delivered as packet data transmitted in accordance with a real-time network transport protocol.

FIG. 2 illustrates an embodiment of program logic performed by the electronic device 100 for processing media content delivered using a real-time network transport protocol. One or more content pipes 112 accesses the media content (Step 200). Also, the application 111 is allowed to select the multimedia components 106 among the available ones in the streaming session. The integration layer 108 enables the application layer 110 to access the media components 106, each of which can perform one or more functions related to the media content (Step 202). The integration layer 108 facilitates communication between the media components 106 independent of a particular hardware or software platform (Step 204). This way, different platforms can be readily supported. The streaming media management component 109 maintains synchronization between different ones of the media components 106 based on timing information delivered to the electronic device 100 (Step 206). In one embodiment, the remote host 102 delivers synchronization information to the electronic device 100. The streaming media management component 109 converts the synchronization information, along with timestamps extracted from the packet data, to new timestamp information compatible with the media components 106. This way, proper synchronization is maintained without requiring one or more of the media components 106 to operate on real-time network transport protocol timestamps. The streaming media management component 109 also converts the packet data, based on the type and format of the media content, from the real-time network transport protocol format to a format compatible with one or more of the media components 106 operable to decode the media content (Step 208).

According to one embodiment, the streaming media management component 109 comprises first and second processing components 114, 116. The first processing component 114 configures the one or more content pipes 112 based on the number, type (e.g., audio, video, still images, timed text, etc.) and possibly format (e.g., WAV, PCM, MIDI, MPEG, WMV, H264, etc.) of the media content and the real-time network transport and control protocols used to transmit the media content (e.g., RTP, RDT, RTSP etc.). In an embodiment, one of the content pipes 112 is configured as a TCP socket and the first processing component 114 initiates a streaming media session with the remote host 102 via the content pipe 112 configured as a TCP socket. For example, the first processing component 114 can issue RTSP commands such as DESCRIBE, SETUP, PLAY, etc. to the remote host 102 via the TCP-configured content pipe 112. One or more other ones of the content pipes 112 are configured as UDP sockets for receiving packet data during the streaming media session. The TCP-configured content pipe 112 can also be used to control the remote host 102 during the streaming media session, e.g., by issuing additional RTSP commands such as PAUSE.

One or more other ones of the content pipes 112 can also be configured as UDP sockets for providing receiver statistics information to the remote host 102. In one embodiment, RTCP reports are exchanged over UDP between the remote host 102 and electronic device 100 for indicating how many packets have been sent and received (in both directions). The RTCP reports can also be used for synchronization. QoE feedback information can be sent from the electronic device 100 to the remote host 102 via RTSP over TCP. The QoE information relates to the media content delivered to the electronic device 100 during the streaming media session. In an embodiment, one or more content pipes 112 can be configured as a UDP socket for each media stream being delivered (e.g., audio, video, images and/or timed-text) so that the remote host 102 is provided receiver statistics information for each stream.

The first processing component 114 also reads packet data from the content pipes 112 and converts synchronization information delivered to the electronic device 100 and timestamps extracted from the packet data to new timestamp information compatible with the media components 106. Moreover, the first processing component 114 (which may include jitter buffers) can use the extracted timestamp information to output the packet data in proper order with the new timestamp information. Alternatively, the first processing component 114 can use RTP sequence numbers associated with the packet data to re-order the packet data. In each case, out-of-order packets are placed in proper sequence. In one embodiment, the packet data is output directly to the second processing component 116 for additional handling. In another embodiment, the first processing component 114 outputs the packet data to a local file stored in memory 118 at the electronic device 100. The second processing component 116 subsequently retrieves the local file from memory 118 and converts the stored packet data to coded media frame data for decoding and playback.

In either embodiment, the second processing component 116 converts the packet data output by the first processing component 114 to coded media frame data based on the type and format of the media content and the real-time network transport protocol used to transmit the media content. In one embodiment, the second processing component 116 removes packet header and other encapsulation information from the packet data. In some cases, the packet data may require de-multiplexing before the packet encapsulation is removed. For example, both Real Media and Windows Media ASF streaming media types typically use a single UDP connection for all media streams. Accordingly, the second processing component 116 de-multiplexes Real Media and Windows Media ASF streams into separate media streams (such as audio and video), e.g., based on stream identifiers embedded in the packet data. The packet encapsulation information is then removed from the de-multiplexed packet streams and converted to separate coded media frame data.

The coded media frame data is then output in a format compatible with the one or more media components 106 operable to decode the media content. In one embodiment, each processing component 114, 116 of the streaming media management component 109 has a number of input and output ports that are configurable based on the type and format of the media content and the real-time network transport protocol used to transmit the media content. Each input of the first processing component 114 is compatible with an output of each content pipe 112. Similarly, each output port of the second processing component 116 is compatible with an input port of the media components 106. In an embodiment, the media content includes multiple media streams (e.g., audio and video). In turn, the first processing component 114 has an input for each media stream that is configured based on the type and format of the media stream and the real-time network transport protocol used to transmit the media stream. The second processing component 116 likewise has an output port for each media stream configured to match an input port of the media component operable to decode the media stream.

The corresponding decoder one of the media components 106 decodes the media frame data provided to it. Other ones of the media components 106 process the decoded data for playback. For example an audio decoder one of the media components 106 decodes the audio portion of the media content while a decoder one of the media components 106 decodes the corresponding video portion. Other ones of the media components 106 provide additional functions such as rendering, synchronization, error correction, etc. Synchronization is maintained between the media components 106 included in the electronic device 100 based on the new timestamp information provided by the streaming media management component 109.

Figure 3:
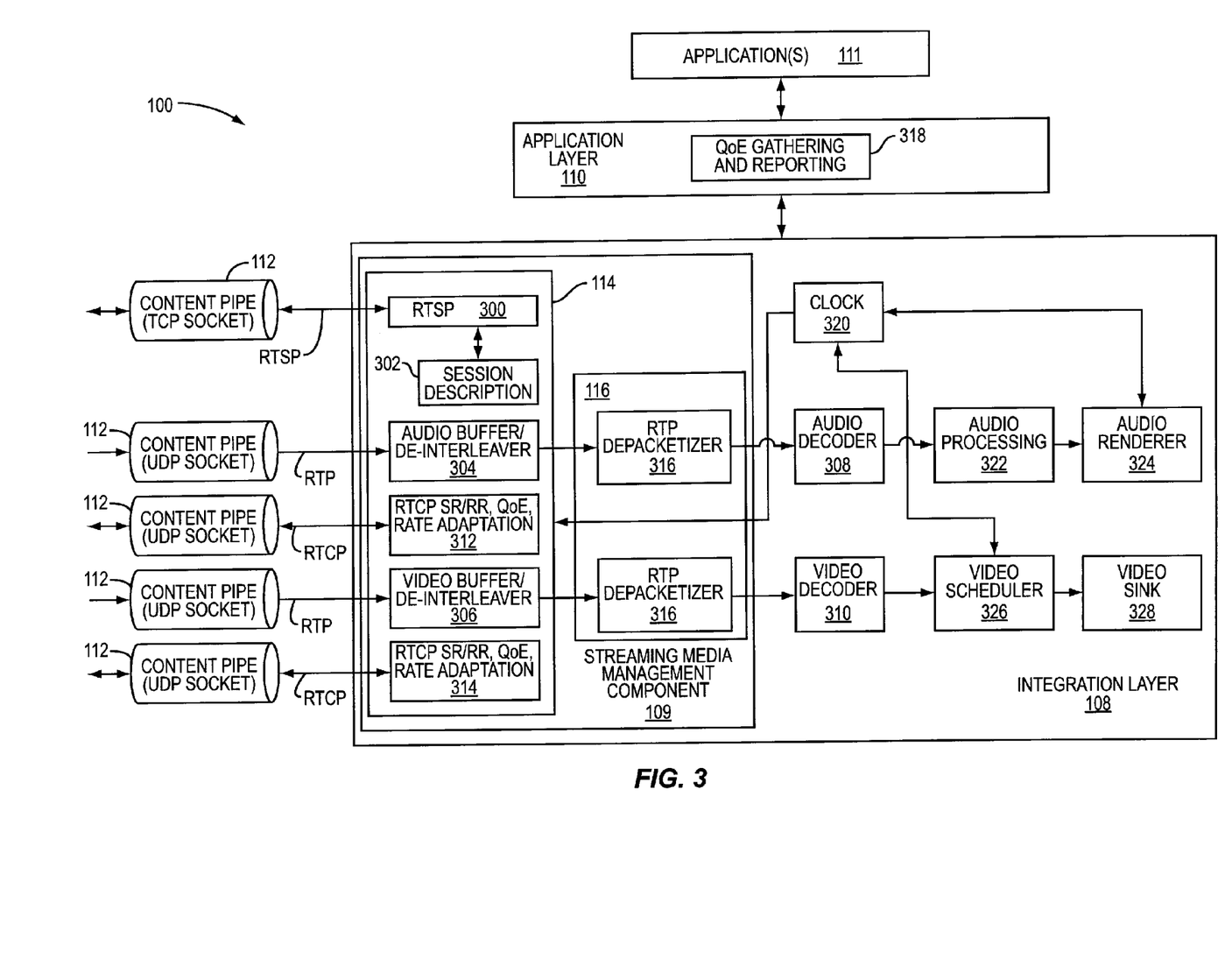
FIG. 3 is a block diagram of another embodiment of an electronic device that processes media content delivered as packet data transmitted in accordance with PSS.

FIG. 3 illustrates another embodiment of the electronic device 100 where the streaming media management component 109 is configured for streaming media content such as PSS. According to this embodiment, the streaming media content is delivered using RTP/RTSP. The first processing component 114 of the streaming media management component 109 includes RTSP logic 300 for configuring one of the content pipes 112 as a TCP socket. This content pipe 112 is used to communicate with the remote host 102 using RTSP. The RTSP logic 300 also handles media retrieval from the content pipes 112, receives media configuration information such as SDP 302, configures the corresponding output ports, and sets up the media streams. In one embodiment, the RTSP logic 300 configures the streaming media management component 109 in this way based on the SDP 302 delivered to the electronic device 100 or by accessing a URI link.

Either way, the RTSP logic 300 also sets up UDP connections via the content pipes 112 for RTP, RTCP and/or RDT transmissions. The RTSP logic 300 performs additional tasks such as managing media buffers such as audio and/or video buffers 304, 306. The re-positioned content is used to issue PAUSE and PLAY RTSP commands to the remote server 102 with a new range. The RTSP logic 300 further maintains tight coupling between RTSP and RTP, most notably for decoder configuration (e.g., from the SDP 302), media setup (from the SDP 302 and RTSP SETUP) and synchronization (either from RTSP PLAY or RTCP receiver report). Moreover, the RTSP logic 300 of the first processing component 114 collects QoE (quality of experience) information generated by a QoE gathering and reporting entity 318 of the application layer 110, collects QoE measurements from RTP jitter buffers (not shown) and reads an OpenMAX clock input media time updates.

The first processing component 114 of the streaming media management component 109 also has additional logic 312, 314 for handling RTCP-based transactions. In one embodiment, the additional logic 312, 314 connects input ports of the streaming media management component 109 to each content pipe 112 configured as a UDP socket, implements jitter buffers for each media stream (e.g., for packet reordering, de-interleaving and elimination of network jitter effects) and in one embodiment, de-multiplexes Windows Media ASF container streams. The additional logic 312, 314 also de-multiplexes Real Media streams and puts OpenMAX timestamps on all packets based on synchronization information received from the remote server 102 (e.g., from an RTCP sender report) and timestamps extracted from the received packet data. Moreover, the additional logic 312, 314 enables the audio and video buffers 304, 306 to output synchronized RTP/RDT streams. For Windows Media, the output is preferably a single RTP stream (not yet de-multiplexed) that is connected to a single RTP de-packetizer 316, which in turn is connected to an ASF container demuxer (not shown). The additional logic 312, 314 also provides QoE measurements to RTSP and may use a local file as input rather than using UDP sockets as described above. The local file may be a recorded streaming session, containing RTP packets in a file container format accessible by the streaming media management component 109. The first processing component 114 of the streaming media management component 109 outputs the local file to one or more de-packetizers 316 included in the second processing component 116 for further processing.

The second processing component 116 includes a de-packetizer 316 for each media stream. Two media streams (audio and video) are shown in FIG. 3, however any desired number of media streams may be processed. The RTP de-packetizers 316 input packet data from the audio and video RTP buffers 304, 306, extract coded media frame data from the packet data and output the coded media frames to the audio and video decoders 308, 310, respectively. For Windows Media streaming, the output is an ASF file stream, which is de-multiplexed by an ASF demuxer in one embodiment. The audio and video decoder components 308, 310 provide QoE measurements to the streaming media management component 109 via a QoE gathering and reporting function 318 of the application layer 110 or a feedback channel. A clock component 320 maintains proper synchronization between the different media streams based on the timing information provided by the streaming media management component 109. This way, the clock component 320 need not process RTP timestamps. Audio processing and rendering as well as video scheduling and sink components 322-328 provide additional functions used by the application layer 110 of the electronic device 100 to play the media content.

Figure 4:
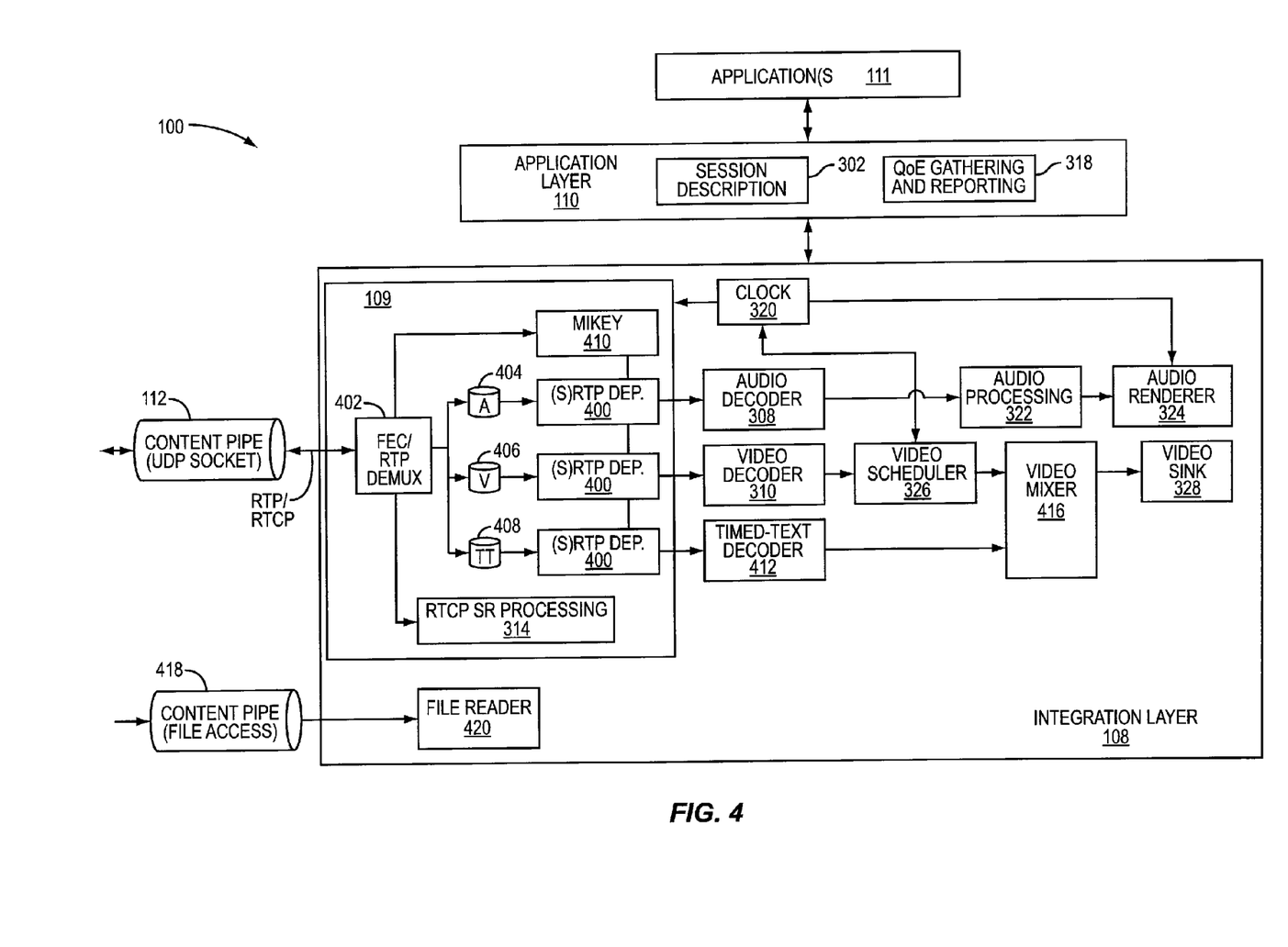
FIG. 4 is a block diagram of yet another embodiment of an electronic device that processes media content as packet data transmitted in accordance with a real-time network transport protocol.

FIG. 4 illustrates yet another embodiment of the electronic device 100 where the streaming media management component 109 is configured for mobile TV media content such as MBMS. A single UDP-based content pipe 112 is used to deliver mobile TV media content via RTP/RTCP. According to one embodiment, the streaming media management component 109 handles encrypted streams and performs FEC (forward error correction). The streaming media management component 109 includes RTP or SRTP (secure RTP) de-packetizers 400 for removing packet header and other encapsulation information for each media stream after a demuxer entity 402 performs de-multiplexing and FEC (FIG. 4 shows three media streams: audio, video and timed-text). In another embodiment, de-packetization is performed by the demuxer entity 402 as part of the de-multiplexing and FEC process. In either embodiment, different streams of packet data (e.g., audio, video and timed-text) are stored in respective buffers 404, 406, 408. The RTP/SRTP de-packetizers 400 input RTP/SRTP packets from the buffers 404, 406, 408 or any other source (e.g., a file). The demuxer entity 402 provides traffic keys to a key management entity 410 that implements a key management protocol such as Multimedia Internet KEYing (MIKEY). The key management entity 410 may reside within the integration layer 108 as shown in FIG. 4 or outside the integration layer 108, e.g., in the application layer 110. The RTP/SRTP de-packetizers 400 decrypt SRTP packets using traffic keys provided by the key management entity 410, extract coded media frame data from the packet data and output the coded media frames to audio, video and timed-text decoders 308, 310, 412.

Audio processing and rendering as well as video scheduling, mixing and sink media components 322, 324, 326, 416, 328 provide additional functions used by the application layer 110 of the electronic device 100 to play the media content. Moreover, an additional content pipe 418 can be allocated for accessing media containers read by a file reader component 420. The file reader component 420 parses each media container such as a 3GPP file and determines the type of decoders needed to decode the media streams. The file reader component 420 also configures its port settings once the media stream formats are determined because the encoding types of a media container can vary.

Figure 5:
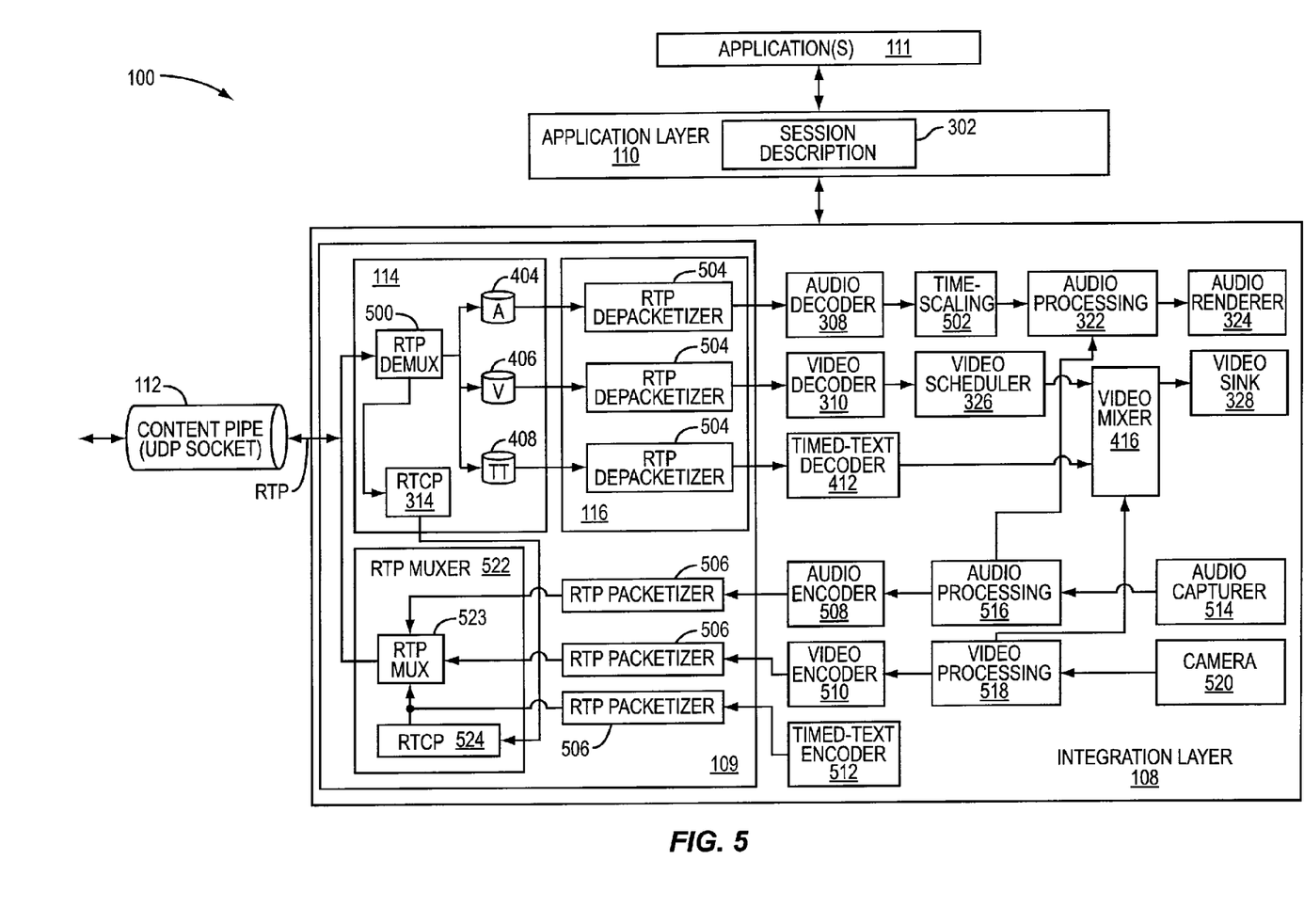
FIG. 5 is a block diagram of still another embodiment of an electronic device that processes media content received and transmitted as packet data transmitted in accordance with a real-time network transport protocol.

FIG. 5 illustrates still another embodiment of the electronic device 100 where the streaming media management component 109 is configured for telephony media content such as MTSI. A single UDP-based content pipe 112 is used to deliver telephony media content using RTP/RTCP. The first processing component 114 of the streaming media management component 109 includes an RTP demuxer component 500 that handles media retrieval by de-multiplexing different media streams (e.g., audio, video and timed-text) received via the UDP-configured content pipe 112. The different media streams are stored in audio, video and timed-text buffers 404, 406, 408, respectfully. The RTP demuxer 500 configures the output ports (to be used by the decoders 308, 310, 412) and connects to the UDP socket content pipe 112. The RTP demuxer 500 also implements jitter buffers for each media stream, for packet reordering and elimination of network jitter effects. The RTP demuxer 500 optionally implements control of a time scaler component 502 to minimize jitter buffer delay and builds RTCP receiver reports. Moreover, the RTP demuxer 500 reads the OpenMAX clock input media time updates and puts OpenMAX timestamps on all packets based on synchronization information received from the remote server 102 (e.g., from an RTCP sender report) and time stamps extracted from the RTP packet data. A synchronized RTP stream is output to a different RTP de-packetizer 504 (or a RTP multiplexer for recording) for each media. The RTP de-packetizers 504 input packet data from the buffers 404, 406, 408 (or from a local file) and extract coded media frame data from the packet data, outputting the coded media frames to the corresponding decoders 308, 310, 412.

The streaming media management component 109 also includes an RTP packetizer 506 for inputting coded media frame data from audio, video and timed-text encoders 508, 510, 512. Audio signals are captured by an audio capturer 514 and sent to an audio processor 516. The audio processor 516 outputs an audio stream to the audio encoder 508 for encoding. The video encoder 510 similarly receives video data from a video processor 518 that processes the output of a video camera 520. The timed-text encoder 512 can be provided for encoding timed-text media. Each RTP packetizer 506 encapsulates the corresponding media stream into RTP packets having correct header information, including timestamps. The RTP packets are output to an RTP muxer 522 having an RTP muxer component 523.

The RTP muxer 523 component connects to the UDP-configured content pipe 112. RTCP logic 524 builds optional RTCP sender reports based on the packet data input to the RTP muxer 522. The RTP muxer 522 then outputs the multiplexed, synchronized RTP media stream to the content pipe 112 (plus any optional RTCP reports). The electronic device 100 transmits the multiplexed MTSI media stream to the remote host 102 for processing. Broadly, the RTP muxer 522 may have one or more outputs each coupled to a different one of the content pipes 112. The RTP muxer 522 uses each UDP-configured content pipe 112 for transmitting RTP packets. Optionally, one or more UDP-configured content pipes 112 can be used to send and receive RTCP packets. The RTP muxer 522 also has a clock port for receiving Media Time updates. The RTP muxer 522 can transmit RTP packets as they become ready. Moreover, as the RTP muxer 522 receives Media Time updates with scale change notifications, the muxer 522 can adjust transmission speed according to the clock scale.

The RTP muxer 522 also has a different input port coupled to the different RTP packetizers 506. The input port receives RTP or RDT packets with RTP and OMX IL time stamps attached. The RTP muxer 522 accepts the following OpenMAX controls: SetParam for OMX_IndexParamCustomContentPipe (used when the content pipe 112 is provided by the application layer 110 and not acquired by the RTP demuxer 500); set connection container; get connection container; set/get execution state (idle/executing/paused); set/get port state (enabled/disabled); set/get port definition; set/get content time position (i.e. IndexConfigTimePosition); get RTCP sender and receiver report information and buffer flush. The RTP muxer 522 may also indicate when port settings have changed.

Each RTP packetizer 506 that provides input to the RTP muxer 522 has an input port coupled to the corresponding encoder 508/510/512. The input port format is the same as the corresponding encoder output port format. Each RTP packetizer 506 also has an output port for the media type handled by that packetizer 506 (e.g., audio, video, images, timed-text, etc.). The format of each output port is RTP or RDT packets with RTP and OMX IL time stamps attached. The RTP packetizers 506 accept the following OpenMAX controls: set/get RTP packetization method; set/get execution state (idle/executing/paused); set/get port state (enabled/disabled); set/get port definition and buffer flush.

The RTP de-packetizers 316, 400, 506 of the different embodiments disclosed herein also have different input and output ports for each media type under consideration (e.g., audio, video, still images, timed-text, etc.). The format of each input port is RTP/RDT packets with OMX IL presentation time stamps attached. The format of each output port is the same as the corresponding decoder input port format. The RTP de-packetizers 316, 400, 506 accept the following OpenMAX controls: get RTP packetization method; set/get execution state (idle/executing/paused); set/get port state (enabled/disabled); set/get port definition and buffer flush. The following is a purely exemplary embodiment of how the RTP de-packetizers 316, 400, 506 are controlled and used. In this example, two RTP media streams are being de-multiplexed. The first stream is an audio stream with AMR-WB format and the second stream is a video stream with H.264 format. The application layer 110 loads and sets a de-packetizer 316/400/506 for each stream. The de-packetizer 316/400/506 associated with the audio stream is configured with an RTP packetization method, e.g. RFC 4867 (RTP Payload Format for AMR and AMR-WB) as indicated to the application layer 110 by the RTP demuxer 402/500 (e.g., using SDP fields). The video de-packetizer 316/400/506 is configured based on, e.g. RFC3984 (RTP Payload Format for H.264 Video). The output port format is also set to match the decoder preferred input format. For example, for audio the output frame format could be "OMX_AUDIO_AMRFrameFormatRTPPayload" or "OMX_AUDIO_AMRFrameFormatlF2". Each incoming RTP packet has a corresponding OMX IL time stamp attached to it. The RTP packets received are de-interleaved by the streaming media management component 109 according to the RTP header information. The de-packetizer 316/400/506 extracts the payload of the RTP packets, converts the extracted payload to the proper output format and transmits the media data to the audio and video decoders 308, 310 with the corresponding time stamps.

The first processing component 114 of the streaming media management component 109 also has different input and output ports for each media type under consideration (e.g., audio, video, still images, timed-text, etc.). One or more of the content pipes 112 coupled to the first processing component 114 are configured as UDP sockets for receiving RTP or RDT packets. One or more additional ones of the content pipes 112 may be optionally configured as a UDP socket for sending and receiving RTCP packets. Yet one more of the content pipes 112 may be optionally configured as a TCP socket for enabling RTSP signaling.

The first processing component 114 of the streaming media management component 109 has one or more clock ports for receiving Media Time updates. Scale changes can be received on the clock ports. The scale factor can be used to indicate normal playback (e.g., scale=1) or pause (e.g., scale=0). The first processing component 114 also has a different output port for each media type under consideration (e.g., audio, video, still images, timed-text, etc.). The format of each output port is RTP/RDT packets with OMX IL presentation time stamp attached. The output ports can be scanned by the application layer 110 for alternative content.

The first processing component 114 of the streaming media management component 109 accepts the following OpenMAX controls: set content URI (either RTSP link or SDP file path); get content URI (actual session URI, extracted from the SDP 302 and after any redirection); SetParam for OMX_IndexParamCustomContentPipe (used when the content pipe 112 is provided by the application layer 110 and not acquired by the RTP demuxer 402/500); set connection container; get connection container; get session name, session information and URI of description from the SDP 302; get connection information from the SDP 302; get bandwidth information from the SDP 302; get availability and time zone information, attribute information and encryption keys from the SDP 302; get media description information from the SDP 302; set/get execution state (idle/executing/paused); set/get port state (enabled/disabled); set/get port definition; query number of alternative versions per output port (i.e. get highest port streams index); set alternative version on an output port (i.e. set active port streams index); set/get content time position (i.e. IndexConfigTimePosition); get RTCP sender and receiver report information and buffer flush. The first processing component 114 of the streaming media management component 109 may send the following events: port settings changed; port format detected; format not detected and redirected.

In one embodiment, connection containers are used to pass connection information in and out of the first processing component 114. The connection containers include the following fields: content-pipe handle (set by the first processing component 114); connection ID to the data bearer (set by the application layer 110); protocol type such as UDP or TCP (set by the application layer 110 or first processing component 114); local and remote IP addresses (set by the first processing component 114); local port number (set by the first processing component 114); available/guaranteed/maximum bit rate (set by the application layer 110). The application layer 110 may set some fields based on the connection establishment handled outside of OpenMAX. These fields are then passed to the first processing component 114 which uses the information and fills in other information during execution. The container is passed up to the application layer 110 again, which can use the new information in order to continue the connection establishment.

The following is a purely exemplary embodiment of how container content is modified for unicast media content. In this example, the application layer 110 establishes a background radio bearer (e.g. a non-real-time primary PDP context) for RTSP signaling done outside of OpenMAX. Particularly, the application layer 110 receives a connection ID handle, which is an abstract reference to the bearer. The application layer 110 fills in the connection ID handle and the protocol type (e.g., TCP for RTSP) in the connection container and passes it to the first processing component 114 of the streaming media management component 109. The first processing component 114 uses the information in the connection container to create a socket content pipe 112 for the specified protocol (e.g., TCP in this case for RTSP). The connection ID handle extracted from the connection container is used as a default connection-ID handle, since the connection container does not yet have the content-pipe handle field set (i.e. it was not initially associated with a specific content pipe 112 already created). The corresponding content pipe 112 is associated with the connection ID handle, by some means outside of the definition of OpenMAX. The outgoing traffic from this content pipe 112 is now sent on the radio bearer that the connection ID handle represents. The connection container is updated with a content-pipe handle, the local and remote IP addresses and the allocated local UDP port number.

The first processing component 114 of the streaming media management component 109 gets the SDP 302 either from the remote server 110 or by opening a local file which was downloaded in advance. The content presented in the SDP 302 is selected on output ports by the application layer 110. An RTSP SETUP command is then sent to retrieve UDP port numbers from remote host 102. Next, the first processing component 114 configures one or more of the content pipes 112 as a UDP socket for each media stream (and RTCP connections if applicable). The first processing component 114 creates connection containers for each UDP socket content pipe 112 created and fills in the following fields: content-pipe handle, protocol type (e.g., UDP), local and remote IP addresses and allocated local UDP port number. The first processing component 114 passes all the connection containers (including the initial one for RTSP) to the application layer 110.

The application layer 110 now has enough information for establishing any real-time radio bearers for media traffic. For instance, the local and remote IP addresses as well as the local UDP port numbers can be used as input for downlink packet flow mapping in the network 104 onto the correct bearer. The application layer 110 can use any content bit rate information as input to what quality of experience requirements the real-time bearer should have. The application layer 110 receives new connection ID handles for the new bearers and updates the connection containers for the associated UDP socket content pipes 112 with the connection ID handles and available/guaranteed/maximum bit rate information. The application layer 110 passes the updated connection containers to the first processing component 114. The first processing component 114 re-associates any UDP socket content pipes 112 with their new connection ID handles, by some means outside of the definition of OpenMAX.

The following is yet another purely exemplary embodiment of how container content is modified for broadcast/multicast media content. In this example, the application layer 110 passes no connection containers to the first processing component 114 in the initial stage. The first processing component 114 opens the SDP 302 from a local file which was downloaded in advance. Based on the content description in the SDP 302, the first processing component 114 configures UDP socket content pipes 112 for the media streams (and RTCP connections if applicable). The first processing component 114 creates connection containers for every UDP socket content pipe 112 created and fills in the content-pipe handle and protocol type (e.g., UDP). The first processing component 114 passes the connection containers up to the application layer 110.

The application layer 110 establishes one or more radio bearers for reception of broadcast media traffic. The application layer 110 receives new connection ID handles for the new bearers and updates the connection containers accordingly. The application layer 110 passes the updated connection containers to the first processing component 114. The first processing component 114 re-associates any UDP socket content pipes 112 with their new connection ID handles, by some means outside of the definition of OpenMAX. The binding of UDP socket content pipes 112 to actual IP addresses and port numbers may be done here or earlier in the process. The electronic device 100 is then ready to receive streaming media content such as audio, video, still images, timed-text, etc.

In one embodiment, the streaming media management component 109 of the electronic device 100 inherits the same possibilities as any OpenMAX framework component. This means that a component such as the first processing component 114 of the streaming media management component 109 can be integrated into the application layer 110 or implemented as separate hardware (e.g., as a companion chip or a hardware accelerator). Further, different components of the streaming media management component 109 may be provided by a separate vendor. Moreover, the streaming media management component 109 enables the use of real-time network transport protocols such as RTSP/RTP and RDT for transmitting streaming media without requiring the application layer 110 to handle the protocol. In one embodiment, the application layer 110 is not in the media data path (meaning that it should not handle RTP). Many different server and client implementations are available and behave differently, requiring a vast amount of interoperability testing in order to ensure server-client compatibility. Such effort is worth much and it is not easy to successfully develop a new RTSP client from scratch. Thus, the streaming media management component 109 provides a seamless way for providing streaming media using real-time network transport protocols with little or no modification to the application layer 110 and media components 106 of the electronic device 100. For example, the first processing component 114 of the streaming media management component 109 can be delivered as a component, including everything needed for streaming.

RTP recording and time shifting is possible (useful for DRM protected media such as SRTP and ISMACryp, but not IPSec) because the output from the first processing component 114 is RTP packet data. The second processing component 116 of the streaming media management component 109 can be used when streaming from the remote server 102 or when performing local playback of earlier recorded material. The decoder media components 308, 312, 412 do not need to be extended to support payload formats, so their function can remain clear and well-defined. Moreover, RTSP and RTP functions are kept together, simplifying the input and output ports of the streaming media management component 109. More specifically, the first processing component 114 of the streaming media management component 109 is responsible for maintaining synchronization between the media streams of a session. Even if no streams need to be de-multiplexed (e.g., because the number of input streams are the same as the number of output streams of the first processing component 114), there needs to be a function that translates inter-system synchronization to intra-system synchronization. The first processing component 114 provides this function by mapping the inter-media synchronization information from the remote server 102 together with the incoming packet time stamps to the internal presentation time per media. This mapping is kept internal to the first processing component 114, simplifying the inputs and output ports of the streaming media management component 109.

The first processing component 114 of the streaming media management component 109 also receives the SDP 302 from the remote server 302 and configures the media streams and handles the reception of the same. Decoder configuration is also received in the SDP 302 and used to configure the output ports of the first processing component 114, reducing the complexity of the streaming media management component 109. In addition, the first processing component 114 is responsible for providing data to the media components 106 for decoding and other processing. The first processing component 114 controls when data shall start flowing and at what position of the content that shall be received. Particularly, the first processing component 114 controls the transmission of the content, which is done using RTSP. In other words, the client side of the RTSP control plane is located in the streaming media management component 109. OpenMAX allows the platform vendor to add third-party components, such as audio and video hardware decoder companion chips, in a standardized way. For example, the components 114, 116 of the streaming media management component 109 can themselves be supplied as third-party components, either in software or in hardware.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A multimedia-enabled device having a multimedia framework including an integration layer and a higher-level OpenMAX application layer, the integration layer of the multimedia framework comprising:
   a plurality of OpenMAX-compliant predefined media processing components having an input/output interface configurable based on the type and format of media content delivered to the multimedia-enabled device during a streaming media session which is established responsive to the OpenMAX application layer requesting delivery of the media content in a real-time network transport protocol format, the predefined media processing components operable to provide predefined media processing functions to the OpenMAX application layer via the integration layer for enabling playback of the media content; and an OpenMAX-compliant streaming media management component operable to:

provide an interface between the integration layer and the OpenMAX application layer so that the OpenMAX application layer has access to the predefined media processing components;

establish and manage the streaming media session;

configure one or more content pipes used during the streaming media session to access packets received by one or more sockets, the packets being encapsulated according to a real-time network transport protocol;

map the one or more content pipes to the one or more sockets; and provide a common boundary between the content pipes and the predefined media processing components for seamlessly handling the media content delivered to the electronic device in the real-time network transport protocol format, including processing of packets retrieved from the one or more content pipes such that the media content is provided to corresponding ones of the predefined media processing components in accordance with their configured input/output interfaces;

wherein the streaming media management component comprises a first processing component operable to:

configure the one or more content pipes based on the type and format of the media content and the real-time network transport protocol used to deliver the media content;

convert synchronization information delivered to the multimedia-enabled device and timestamps extracted from the packets to new timestamp information compatible with the corresponding ones of the predefined media processing components; and extract data from the packets in proper order with the new timestamp information; and wherein the streaming media management component comprises a second processing component operable to:

convert the extracted data to coded media frame data based on the type and format of the media content and the real-time network transport protocol used to transmit the media content; and output the coded media frame data in a format compatible with the configured input/output interfaces of the corresponding ones of the predefined media processing components.

2. The multimedia-enabled device of claim 1, wherein each processing component of the streaming media management component has at least one content pipe input and at least one output port configurable based on the type and format of the media content and the real-time network transport protocol used to deliver the media content.

3. The multimedia-enabled device of claim 1, wherein the first processing component is operable to output the extracted data in proper order with the new timestamp information to a local file stored at the multimedia-enabled device and the second processing component is operable to convert the local file from stored packet data to the coded media frame data for playback of the media content.

4. The multimedia-enabled device of claim 1, wherein the streaming media management component is operable to:

configure one of the content pipes in accordance with TCP; and initiate the streaming media session via the content pipe configured in accordance with TCP.

5. The multimedia-enabled device of claim 4, wherein the streaming media management component is operable to initiate and control the streaming media session using RTSP.

6. The multimedia-enabled device of claim 4, wherein the streaming media management component is operable to configure one or more additional ones of the content pipes in accordance with UDP for accessing RTP packets received during the streaming media session.

7. The multimedia-enabled device of claim 1, wherein the streaming media management component is operable to:

configure at least one of the content pipes in accordance with UDP; and provide quality of service feedback information related to the media content via each content pipe configured in accordance with UDP using RTCP.

8. The multimedia-enabled device of claim 1, wherein the streaming media management component is operable to de-multiplex a plurality of different media streams from the retrieved packets.

9. The multimedia-enabled device of claim 1, wherein the streaming media management component is operable to de-interleave the retrieved packets based on header information extracted from the retrieved packets, extract payload data from the de-interleaved packets and convert the extracted data to coded media frame data to a format compatible with the configured input/output interfaces of the corresponding ones of the predefined media processing components.

10. The multimedia-enabled device of claim 1, wherein the streaming media management component is operable to determine the type and format of the media content based on session description information delivered to the multimedia-enabled device or by accessing a URI link.

11. The multimedia-enabled device of claim 1, wherein the first processing component of the streaming media management component is further operable to:

input coded media frame data from one or more of the predefined media processing components operable to encode media data;

convert the coded media frame data to new packets in accordance with the real-time network transport protocol; and output the new packets to the second processing component of the streaming media management component; and wherein the second processing component is further operable to:

connect to one or more of the content pipes configured in accordance with UDP; and send the new packets to the one or more of the content pipes configured in accordance with UDP for transmission via one or more of the sockets.

12. In a multimedia-enabled device having a multimedia framework including an integration layer and a higher-level OpenMAX application layer, the integration layer of the multimedia framework having a plurality of OpenMAX-compliant predefined media processing components with input/output interfaces configurable based on the type and format of media content delivered to the multimedia-enabled device during a streaming media session which is established responsive to the OpenMAX application layer requesting delivery of the media content in a real-time network transport protocol format, the predefined media processing components operable to provide predefined media processing functions to the OpenMAX application layer for enabling playback of the media content, the method comprising, within the integration layer:

providing an interface between the integration layer and the OpenMAX application layer so that the OpenMAX application layer has access to the predefined media processing components;

establishing and managing the streaming media session;

configuring one or more content pipes used during the streaming media session to access packets received by one or more sockets based on the type and format of the media content and a real-time network transport protocol used to deliver the media content;

mapping the one or more content pipes to the one or more sockets;

providing a common boundary between the content pipes and the predefined media processing components for seamlessly handling the media content delivered to the multimedia-enabled device in the real-time network transport protocol format, including processing packets extracted from the one or more content pipes such that the media content is provided to corresponding ones of the predefined media processing components in accordance with their configured input/output interfaces;

converting synchronization information delivered to the multimedia-enabled device and timestamps extracted from the packets to new timestamp information compatible with the corresponding ones of the predefined media processing components;

converting the packets to coded media frame data based on the type and format of the media content and the real-time network transport protocol used to transmit the media content; and     providing the coded media frame data in a format compatible with the configured input/output interfaces of the corresponding ones of the predefined media processing components.

13. The method of claim 12 comprising, within the integration layer:

configuring one of the content pipes in accordance with TCP; and     initiating and controlling the streaming media session via the content pipe configured in accordance with TCP.

14. The method of claim 13 comprising initiating the streaming media session within the integration layer using RTSP.

15. The method of claim 13 comprising configuring one or more additional ones of the content pipes in accordance with UDP within the integration layer for accessing RTP packets received during the streaming media session.

16. The method of claim 12 comprising, within the integration layer:

configuring at least one of the content pipes in accordance with UDP; and     providing quality of service feedback information related to the media content via each content pipe configured in accordance with UDP using RTCP.

17. The method of claim 12 comprising de-multiplexing a plurality of different media streams from the packets within the integration layer.

18. The method of claim 12 comprising, within the integration layer:

storing data extracted from the packets in proper order to a local file stored at the multimedia-enabled device; and     subsequently converting the local file to coded media frame data in a format compatible with the configured input/output interfaces of the corresponding ones of the predefined media processing components.

19. The method of claim 12 comprising, within the integration layer:

de-interleaving the packets based on header information extracted from the packets;

extracting payload data from the de-interleaved packets; and     converting the extracted data to coded media frame data in a format compatible with the configured input/output interfaces of the corresponding ones of the predefined media processing components.

20. The method of claim 12 comprising determining the type and format of the media content within the integration layer based on session description information delivered to the multimedia-enabled device or by accessing a URI link.

21. The method of claim 12 comprising, within the integration layer:

converting coded media frame data provided by one or more of the predefined media processing components to new packets in accordance with the real-time network transport protocol;

connecting to one or more of the content pipes configured in accordance with UDP; and sending the new packets to the one or more of the content pipes configured in accordance with UPD for transmission via one or more of the sockets.

* * * * *